(No Model.)
L. S. WOOD.
Cultivator Tooth.
No. 233,058. Patented Oct. 5, 1880.
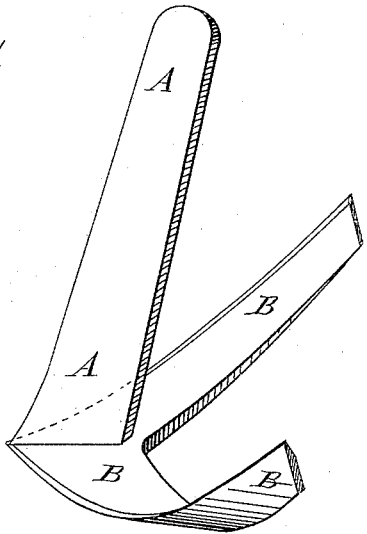
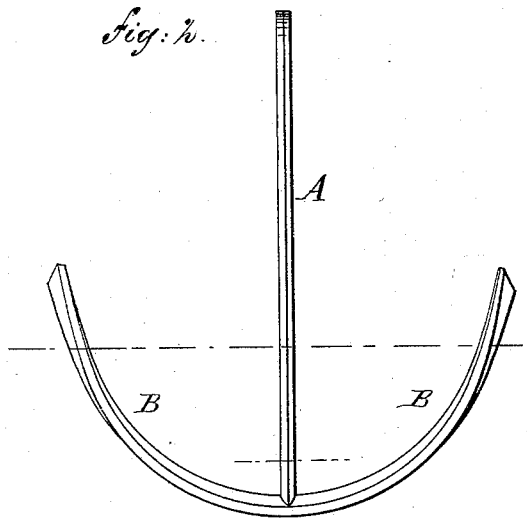
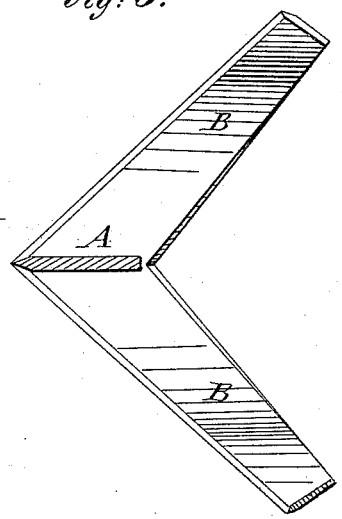
WITNESSES:
Chas. Niola
C. Sedgwick
INVENTOR:
L. S. Wood
BY Munn & Co
ATTORNEYS.

UNITED STATES PATENT OFFICE.

LEVI S. WOOD, OF MARION, IOWA.

CULTIVATOR-TOOTH.

SPECIFICATION forming part of Letters Patent No. 233,058, dated October 5, 1880.

Application filed March 17, 1880. (No model.)

*To all whom it may concern:*

Be it known that I, LEVI S. WOOD, of Marion, in the county of Linn and State of Iowa, have invented a new and useful Improvement in Cultivator-Teeth, of which the following is a specification.

Figure 1 is a perspective view of the improvement. Fig. 2 is a front elevation. Fig. 3 is a plan view, the standard being shown in section.

Similar letters of reference indicate corresponding parts.

The object of this invention is to furnish cultivator-teeth so constructed as to cut shallow near the plants and deeper at a little distance from the plants, which may be guided close to the plants, will not cover small plants with soil, and will leave the soil loose and level.

A represents the standard of the tooth, which is designed to be attached to the cultivator beam or frame. The forward edge of the standard A is sharpened, so that the said standard may act as a colter to cut through grass or weeds or hard soil. The standard A may be upright, or may incline forward or may incline rearward, as the character of the soil or the wish of the buyer may require. In the drawings the standard is shown as made with a rearward inclination.

Upon the opposite sides of the lower end of the standard A are formed two wings, B, which incline to the rearward, and are curved upward with a slight twist, the ends of the wings B rising so high as to project above the soil, to serve as guides, so that the plowman can work close to the plants without injuring them, the projecting ends of the wings B enabling the plowman to see exactly where the plow is working. With this construction the plow works shallow close to the plants, so as not to injure their roots, and works deeper at a little distance from the plants, so as to leave the soil loose for the roots to run into. With this construction the soil will be raised, will pass back between the standard A, and the outer ends of the wings B will drop down into about the place from which it was raised, and will be loose, leaving the surface of the ground level, all the weeds and grass being cut off and destroyed.

Having thus described my invention, I claim as new and desire to secure by Letters Patent—

A cultivator-tooth constructed substantially as shown and described, consisting of the central standard, A, having sharpened forward edge, and the circular cutter B, having its wings slightly twisted and formed upon the end of the standard A, as set forth.

LEVI STILLMAN WOOD.

Witnesses:
J. WM. HOULETT,
PHINEAS MARTIN.